United States Patent [19]
Ottenstein

[11] 3,747,082
[45] July 17, 1973

[54] SYSTEMS WITH CONSTANT CURRENT GENERATORS FOR TRANSMITTING FLOW RATE DATA

[75] Inventor: Sidney Allan Ottenstein, Spring, Tex.

[73] Assignee: M & J Valve Company, Houston, Tex.

[22] Filed: Aug. 23, 1971

[21] Appl. No.: 173,992

[52] U.S. Cl. .............................. 340/205, 307/270
[51] Int. Cl. ................................ G08c 19/16
[58] Field of Search .................. 340/205; 178/68; 73/194 R, 194 EM, 229

[56] References Cited
UNITED STATES PATENTS

| | | | |
|---|---|---|---|
| 2,084,742 | 6/1937 | Pudelko | 340/205 |
| 2,755,432 | 7/1956 | Arps | 340/205 |
| 3,349,177 | 10/1967 | Cattermole | 178/68 |
| 3,359,433 | 12/1967 | Thauland | 178/68 |
| 3,476,879 | 11/1969 | Zenner | 178/68 |
| 3,497,618 | 2/1970 | Thayer | 178/68 |
| 3,497,619 | 2/1970 | Babcock | 178/68 |
| 2,729,103 | 1/1956 | Raynsford | 73/194 R |
| 3,425,274 | 2/1969 | Clement | 73/229 |
| 3,530,713 | 9/1970 | Nazareth | 73/194 EM |
| 3,550,446 | 12/1970 | Tucker | 73/194 EM |
| 3,681,984 | 8/1972 | Tur | 73/194 R |

Primary Examiner—Thomas B. Habecker
Attorney—Flehr, Hohbach, Test, Albritton & Herbert

[57] ABSTRACT

System and method for transmitting a pulsating signal from a pipeline flowmeter to a station located remotely of the flowmeter. The pulsating flowmeter signal is converted to current pulses of constant magnitude, and these pulses are passed along a transmission line to the remotely located station where the line is terminated in a resistive load.

5 Claims, 2 Drawing Figures

3,747,082

SYSTEMS WITH CONSTANT CURRENT GENERATORS FOR TRANSMITTING FLOW RATE DATA

BACKGROUND OF THE INVENTION

This invention pertains generally to flowmeters and systems for measuring volumetric flow in pipelines and more particularly to a system and method for transmitting the output signal from a flowmeter to a station located remotely of the flowmeter.

Volumetric turbines and positive displacement flowmeters are widely used for measuring the volumetric flow of various liquids such as oil and other petroleum products in pipelines. These flowmeters generally include means for generating a train of pulses having a frequency dependent upon the movement of a turbine rotor or other sensing element interposed in the flowline. This pulse signal is monitored at a remote location where readout or registering means may be located. The remote location may typically be separated from the flowmeter by a distance of several miles or more.

SUMMARY AND OBJECTS OF THE INVENTION

The invention provides a new and improved system and method for transmitting the flowmeter signal to a remotely located station. The pulsating flowmeter signal is converted to current pulses of constant magnitude, and these pulses are passed along a transmission line to the remote station. At this station, the line is terminated in a resistive load. The constant current pulses are produced by a pair of current generators arranged in such manner that one generator maintains a constant current of one polarity in the transmission line for a predetermined period of time after each pulse in the flowmeter signal. Thereafter, the other generator maintains a constant current of the opposite polarity in the line. Since the current in the line and, hence, in the load is maintained at a constant level, the system has a very high degree of series mode rejection, that is the ability to reject unwanted noise signals generated on one side of the line. A difference amplifier removes common mode noise from the flowmeter signal, and the current generators are arranged in such manner that a difference amplifier can also be used at the remote station to remove any common mode noise that may be developed by the transmission line. Thus, the system has a very high degree of both common and series mode rejection.

It is in general an object of the present invention to provide the new and improved system and method for transmitting a pulsating signal from a flowmeter to a station located remotely of the flowmeter.

Another object of the invention is to provide a system and method of the above character having a high degree of both common and series mode noise rejection.

Additional objects and features of the invention will be apparent from the following description in which the presently preferred embodiment is set forth in detail in conjunction with the accompanying drawing.

DESCRIPTION OF THE PREFERRED EMBODIMENT

Figure 1:
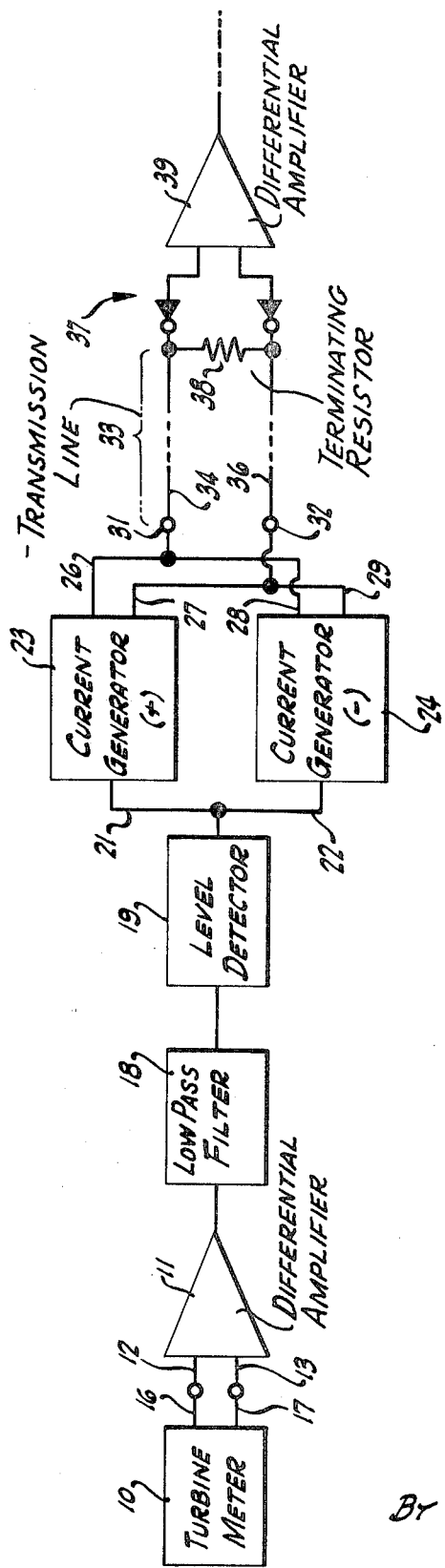
FIG. 1 is a block diagram of one embodiment of a transmission system incorporating the present invention.

In FIG. 1 the invention is shown in connection with a flowmeter 10 of the turbine type. Meters of this type commonly have a rotor which is disposed in a pipeline and driven by the fluid flowing in the line. The meter produces an output signal consisting of a train of electrical pulses at a rate corresponding to the flow rate.

The invention includes a differential amplifier 11 having a pair of input terminals 12 and 13. The output of the flowmeter is connected to these terminals through lines 16 and 17. Since the output of the differential amplifier is the difference between the signals applied to its input terminals, this amplifier provides a high degree of common mode rejection, that is the ability to cancel noise signals appearing on both input terminals.

The output of the differential amplifier 11 is passed through a high frequency filter 18 which removes high frequency noise from the amplified signal.

The output of the filter 18 is connected to the input of a level detector or sensor 19. In the presently preferred embodiment, the level detector comprises a Schmitt trigger which fires when the amplified and filtered flowmeter signal reaches a predetermined level.

The output of the level detector is connected through leads 21 and 22 to a pair of constant current generators 23 and 24, respectively. These generators are adapted to maintain currents of constant magnitude and opposite polarities in circuits connected to their outputs. Thus, the output of the generator 23 has a positive terminal 26 and common terminal 27, and the output of the generator 24 has a negative terminal 28 and a common terminal 29. The positive and negative generator terminals 26, 28 are connected to a single output terminal 31, and the common generator terminals 27, 29 are connected to a common output terminal 32. As is more fully discussed hereinafter, the generators 23 and 24 are arranged in such manner that only one of them is energized at a time, and the polarity of current delivered to a circuit connected between the output terminals 31 and 32 is dependent upon which of the generators is energized.

A transmission line 33 consisting of conductors 34 and 36 extends between the output terminals 31 and 32 and a receiving station 37 which is located remotely of the flowmeter and current generators. The line 33 might typically have a length on the order of several miles or more.

At the remote station 37, the transmission line 33 is terminated in a resistor 38 which, in the preferred embodiment, is matched to the output impedance of the current generators and the impedance of the transmission line. For example, in one presently preferred embodiment, this resistor has a resistance on the order of 120 ohms. A differential amplifier 39 can be connected across the resistor 38 to increase the amplitude of the output signal and to reject any common mode noise on the signal from the transmission line. The output of the amplifier 39 is a pulsating signal which corresponds to the output of the flowmeter 10. This signal can be monitored and utilized as desired at the receiving station.

Figure 2:
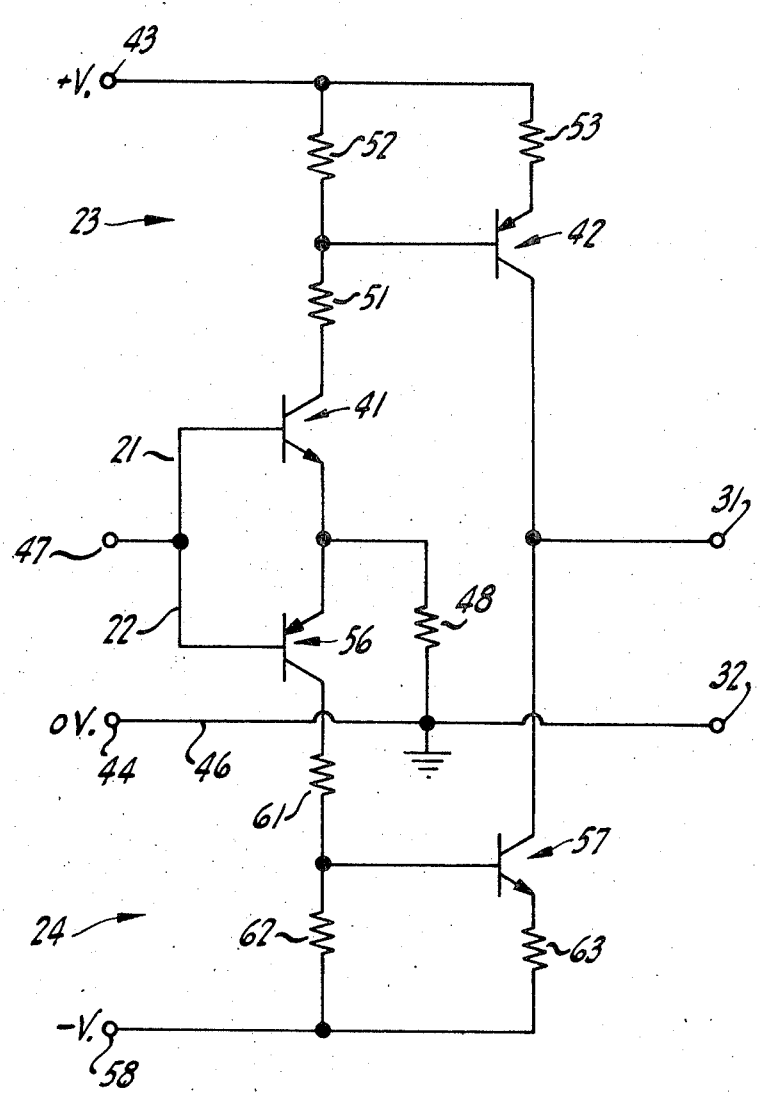
FIG. 2 is a schematic diagram of one embodiment of a pair of constant current generators which can be utilized in a system shown in FIG. 1.

The constant current generators 23 and 24 are shown in detail in FIG. 2. The generator 23 includes an NPN input transistor 41 and a PNP current regulating transistor 42. A positive operating voltage +V is applied between a positive input terminal 43 and a common input terminal 44 which is connected to a common or grounded line 46. The output of the level detector is applied between a signal input terminal 47 and the common input terminal 44.

The signal input terminal 44 is connected to the base of the transistor 41 through a circuit 21. The emitter of this transistor is connected to the common lead 46 through a resistor 48, and the collector of this transistor is conneected to the positive voltage terminal 43 through resistors 51 and 52. The junction of the resistors 51 and 52 is connected to the base of the transistor 42. The emitter of this transistor is connected to the positive terminal 43 through a resistor 53, and the collector is connected to the output terminal 31. The output terminal 32 is connected to the common lead 46.

The transistors 41 and 42 are both biased in the their off conditions in the absence of a positive signal at the input terminal 47. In this condition, the generator 23 delivers no current to a load connected to the output terminals 31 and 32. A positive voltage at the input terminal 47 turns on the transistor 41, and the transistor 42 begins to conduct at a level determined by the resistors 51, 52 and 53. Current is now supplied through the transistor 42 to a load connected between the output terminals 31 and 32. Any change in this current produces a corresponding change in the voltage across the resistor 53, thereby increasing or decreasing the conductivity of the transistor 42 in a manner tending to oppose the change in the load current. Thus, the load current is maintained at a constant level as long as the input signal voltage is positive and the generator remains turned on.

The current generator 24 is generally similar to the generator 23 except that the polarities of the supply voltage, transistors and output current are reversed. This generator includes a PNP input transistor 56 and an NPN current regulating transistor 57. A negative operating voltage −V is applied between a negative input terminal 58 and the common input terminal 44.

The signal input terminal 47 is connected to the base of transistor 56 through the circuit 22. The emitter of this transistor is connected to the common lead 46 through the resistor 48, and the collector is connected to the negative voltage terminal 58 through resistors 61 and 62. The junction of these resistors is connected to the base of the transistor 57, and the emitter of this transistor is connected to the negative supply terminal through a resistor 63. The collector of the transistor 57 is connected to the output terminal 31. The operation of the generator 24 is generally similar to that of the generator 23, except that this generator is turned on by a negative signal at the input terminal 47.

Operation of the transmission system described above and therein the method of the invention can now be described. It is assumed that the flowmeter 10 is connected to a pipeline and is producing a pulsating signal corresponding to the rate of flow in the line. This signal is amplified and filtered by the differential amplifier 11 and filter 18, and each time a pulse in the signal reaches a predetermined level, the level detector or Schmitt trigger 19 fires. When the Schmitt trigger fires, it delivers a positive output voltage to the circuits 21 and 22, turning on the current generator 23. Having been turned on, this generator maintains a current of positive polarity and constant magnitude in both the transmission line 33 and the terminating resistor 38.

When the Schmitt trigger returns to its normal state, it delivers a negative voltage to the circuits 21 and 22, thereby turning off the generator 23 and turning on the generator 24. When turned on, the generator 24 maintains a current of negative polarity and constant magnitude in the line 33 and terminating resistor 38.

The cycle repeats for each pulse in the signal from the flowmeter having the amplitude set by the level detector. Thus, the amplifier 11, filter 18, level detector 19 and current generators 23 and 24 serve to convert the flowmeter pulses to constant current pulses which are transmitted along the transmission line to the receiving station. There the current pulses produce a pulsating voltage across the terminating resistor. It will be noted that the bottom end of the terminating resistor is always maintained at a zero voltage level while the voltage at the top of the resistor switches between positive and negative levels in accordance with the flowmeter signal. Since the output voltage switches in this manner, it can be amplified by the differential amplifier 39 to remove any common mode noise that may be developed by the transmission line.

The invention has many desirable features. For example, the differential amplifier 11 eliminates common mode noise from the flowmeter signal, and the filter 18 removes any high frequency noise that may appear on this signal. By firing only when the amplified flowmeter signal reaches a predetermined level, the level detector 19 reduces unwanted signals when the flowmeter is at rest. The current generators 23 and 24 serve to regulate the current in the transmission line 33 and terminating resistor 38 at a predetermined level. If unwanted noise is generated on either or both sides of the transmission line, the noise does not appear across the terminating resistor because the output signal is the product of the current and the resistance, and both the current and the resistance are fixed. Thus, the system has a high degree of series mode rejection, that is the ability to eliminate noise signals appearing on one side of the transmission line. In addition, as pointed out previously, the differential amplifier 39 provides additional means for removing any common mode noise that may be developed by the transmission line.

The output voltage measured across the terminating resistor is predictable and independent of the resistive characteristic of the transmission line. The combination of the output impedance of the current generators in series with the impedance of the transmission line is constant, and the value of the terminating resistor can be accurately matched to this combined impedance. The output end of the transmission line can be short circuited without incurring any damage to the current generators. The level of series mode rejection of unwanted noise signals on the transmission line can be controlled by adjusting the gain of the constant current generators and/or adjusting the level of the supply voltage applied to these generators.

It is apparent from the foregoing that a new and improved transmission system and method have been provided. While only one presently preferred embodiment has been described, it will be apparent that certain changes and modifications can be made without departing from the scope of the invention as defined by the following claims.

I claim:

1. In a system for transmitting pipeline flow data to a remotely located station, flowmeter means for providing a pulse signal corresponding to the rate of flow in a pipeline, an electrically conductive transmission line extending between the flowmeter means and the remotely located station, first and second constant current generating means for delivering currents of opposite polarities to the transmission line when actuated, means responsive to the pulse signal for actuating the first generating means when the signal is above a predetermined level and actuating the second generating means when the signal is below said predetermined level, and resistive terminating means connected to the transmission line at said remotely located station.

2. A flow data transmission system as in claim 1 including difference amplifier means for amplifying signals applied between its input terminals and cancelling signals common to said terminals, together with means for applying the pulse signal between the input terminals.

3. A flow data transmission system as in claim 1 wherein the resistive terminating means comprises a resistor having a value matched to the output impedance of the current generating means and the impedance of the transmission line.

4. In a system for transmitting pipeline flow data over a transmission line to a remotely located station, flowmeter means for providing a pulse signal corresponding to the rate of flow in a pipeline, differential amplifier means having a pair of input terminals connected to the flowmeter means for amplifying the pulse signal and cancelling signals common to the input terminals, level sensing means responsive to the amplified pulse signal for switching from a first output state to a second output state when the pulse signal reaches a predetermined level and returning to the first state a predetermined time thereafter, and constant current generating means controlled by the level sensing means for delivering a substantially constant current of one polarity to the transmission line when the level sensing means is in its first output state and delivering a substantially constant current of the opposite polarity to the line when the level sensing means is in its second output state.

5. A system as in claim 4 wherein the level sensing means comprises a Schmitt trigger.

* * * * *